United States Patent [19]
Pitchford et al.

[11] 4,379,976
[45] Apr. 12, 1983

[54] PLANOCENTRIC GEAR DRIVE

[75] Inventors: Edward J. Pitchford, Glendora; Edward M. Troup, Mount Baldy, both of Calif.

[73] Assignee: Rain Bird Sprinkler Mfg. Corp., Glendora, Calif.

[21] Appl. No.: 284,714

[22] Filed: Jul. 20, 1981

[51] Int. Cl.³ .............................................. F16H 1/20
[52] U.S. Cl. ...................................... 310/83; 74/640; 74/804; 310/82
[58] Field of Search .................. 310/81, 82, 83, 49 R, 310/78, 80; 74/804, 805, 460, 640

[56] References Cited

U.S. PATENT DOCUMENTS

| Re. 27,446 | 8/1972 | Welch | 310/49 R |
|---|---|---|---|
| 107,432 | 9/1870 | Zeigler | 74/804 |
| 2,250,259 | 7/1941 | Foote, Jr. | 74/805 |
| 2,508,121 | 5/1950 | McIver | 74/804 |
| 2,857,536 | 10/1958 | Light | |
| 3,098,400 | 7/1963 | Hedges | 74/804 |
| 3,301,091 | 1/1967 | Reese | |
| 3,456,139 | 7/1969 | Newell | 310/49 R |
| 3,561,006 | 2/1971 | Humphreys | 310/82 |
| 3,894,255 | 7/1975 | Newton, Jr. | 310/80 |

OTHER PUBLICATIONS

Verge, K. W. et al., "Dynavector Motor and its Development", 1968 Fluid Power International Conference.

Primary Examiner—J. D. Miller
Assistant Examiner—D. L. Rebsch
Attorney, Agent, or Firm—Fulwider, Patton, Rieber, Lee & Utecht

[57] ABSTRACT

A planocentric gear drive has an eccentrically floating driving gear for simultaneously engaging a stator gear and a rotatable output gear to rotate the output gear through relatively small angular increments. The stator and output gears have different numbers of teeth and are mounted coaxially for engaging the driving gear on a common axial line of contact wherein the stator and output gear teeth are in local axial alignment at the line of contact. The driving gear is attracted into meshing engagement with the stator and output gears by a circumferentially arranged plurality of electromagnets energizable in sequence to rotate the driving gear eccentrically in steps about the stator and output gears. During this eccentric rotation, the common axial line of contact revolves in steps about the stator and output gears, with the output gear rotating through small angular increments to permit the stator and output gear teeth to remain in axial alignment at the revolving line of contact. When energization of the electromagnets ceases, the driving gear engaging the stator and output gears locks the output gear against rotation with respect to the stator gear.

53 Claims, 12 Drawing Figures

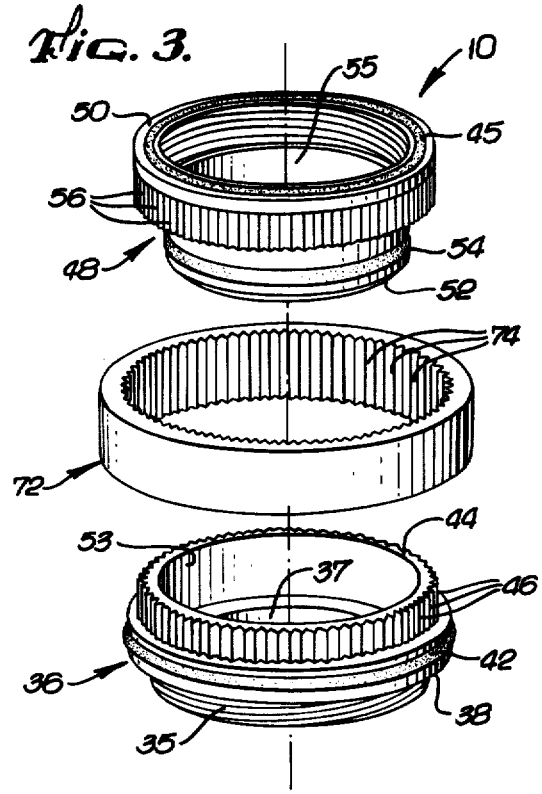
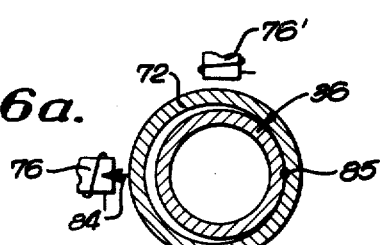
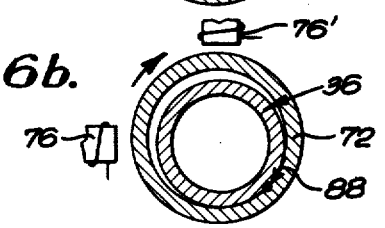
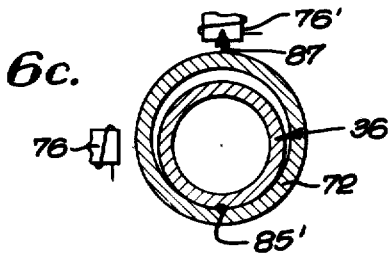
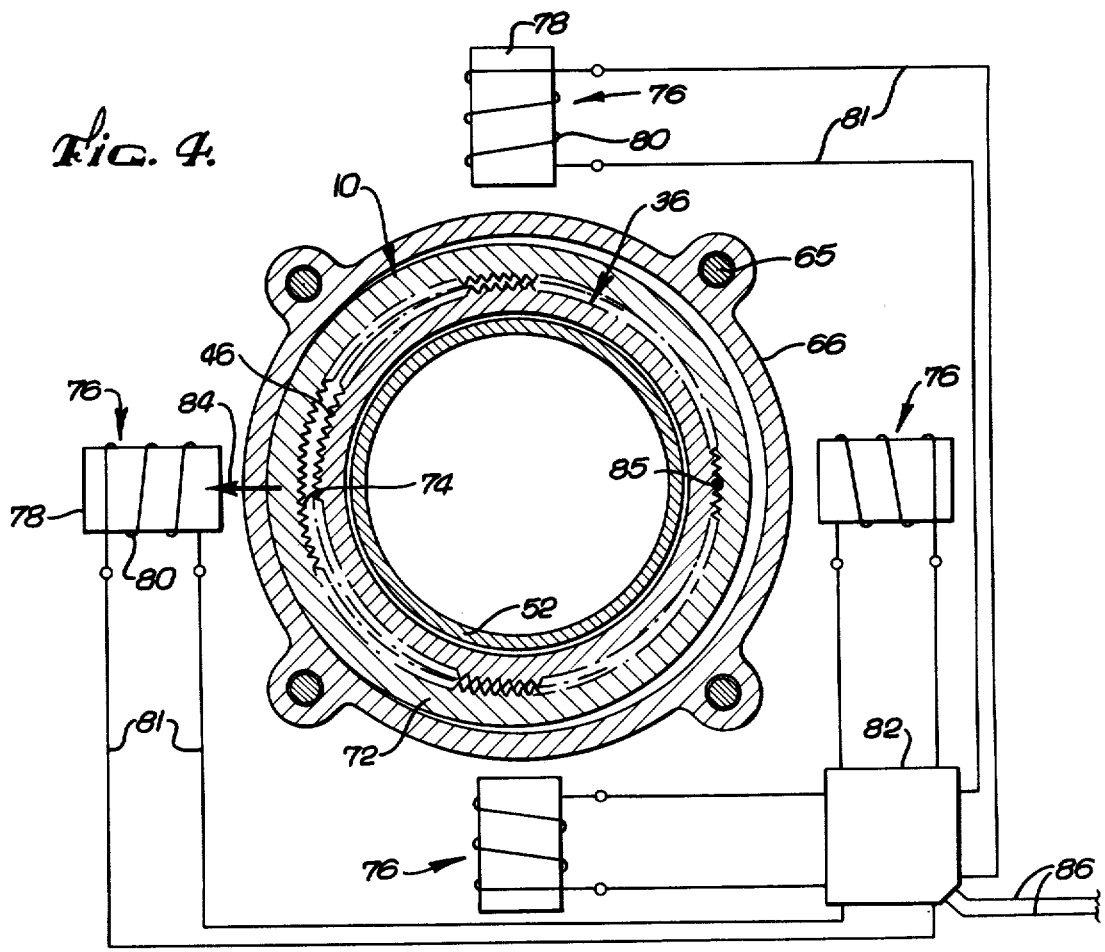

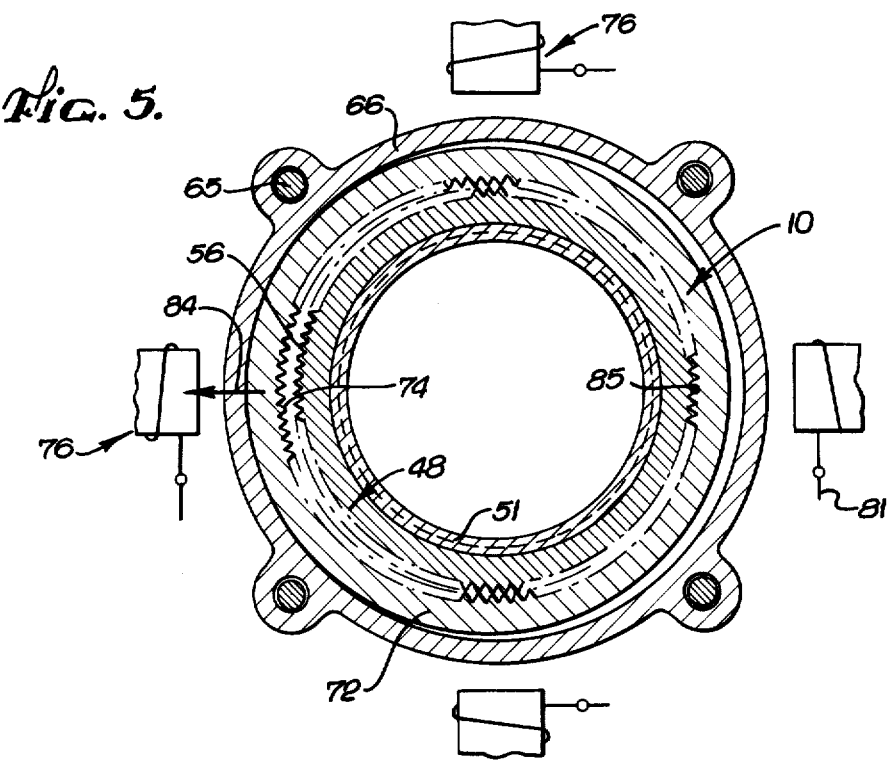
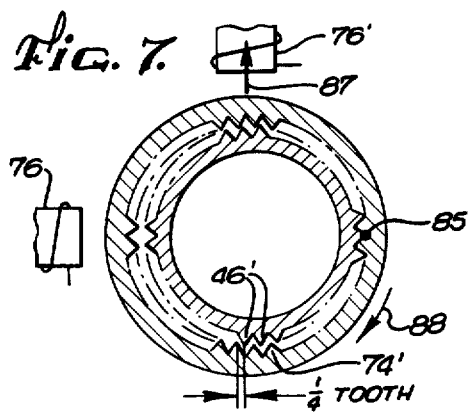
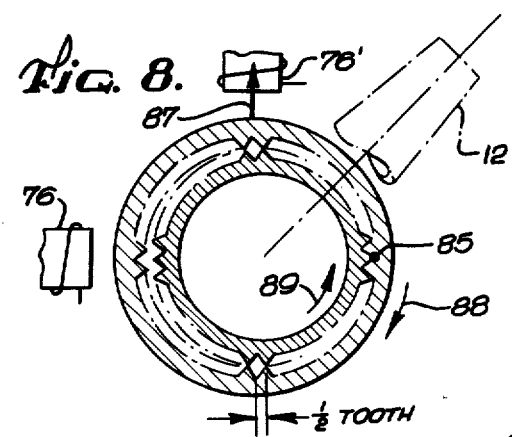
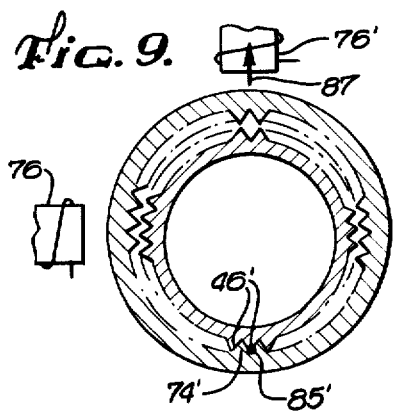
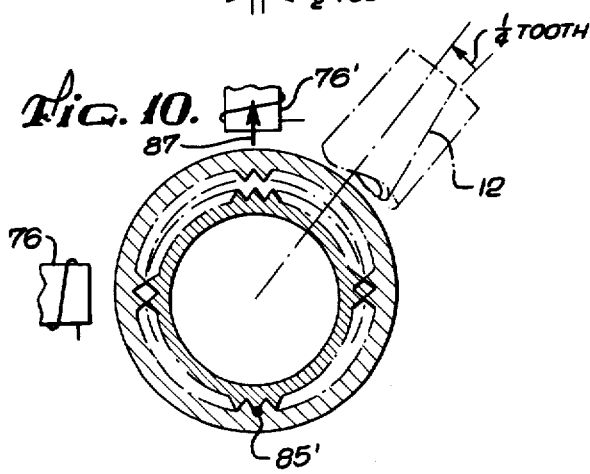

PLANOCENTRIC GEAR DRIVE

BACKGROUND OF THE INVENTION

This invention relates in general to planocentric gear drives. More specifically, this invention relates to an improved planocentric gear drive for use as a simplified and inexpensive stepping motor with an output rotatable in relatively small angular increments and locked against rotation when not in use.

Planocentric gear drives in general are known in the art and typically comprise at least two meshing coplanar gears designed to convert a rotary drive input to a rotary output with substantial speed reduction. Such gear drives commonly include a rotatable driving gear in meshing engagement with a fixed stator gear, and driven by the rotary input in an eccentric or orbital path about the axis of the stator gear. By appropriate selection of the relative numbers of teeth on the driving and stator gears, the driving gear rotates about its own axis relatively slowly with respect to the number of its orbital revolutions about the axis of the stator gear to provide a relatively slow speed rotary motion which can be coupled to an output shaft, an output gear, or the like.

A variety of specific planocentric gear drive configurations have been proposed for accommodating different types of rotary input and rotary output structures in different operating environments. For example, some planocentric gear drives have been developed wherein the driving gear is eccentrically driven in meshing engagement with the stator gear by a rotating mechanical drive shaft, such as those shown and described in U.S. Pat. Nos. 107,432 and 2,508,121. Other planocentric gear drives have been proposed including electromagnetic systems for moving the driving gear in an orbital path about the axis of the stator gear. See, for example, U.S. Pat. Nos. 3,456,139; 3,561,006; Re. 27,446; and 3,894,255.

The use of electromagnetic systems for orbitally moving the driving gear advantageously simplifies the planocentric gear drive by eliminating the mechanical drive shaft and its attendant bearings, drive means, and the like. Moreover, electromagnetic systems facilitate operation of the gear drive as a stepping motor wherein the rotary output is moved through relatively small angular increments. For example, some electromagnetic systems utilize a plurality of circumferentially arranged electromagnets energized in sequence to orbit the driving gear in steps, and thereby provide the desired incrementally stepped output. However, positive engagement between the gears ceases when power to the electromagnets is turned off to permit the gears to be rotated relative to each other. Alternately stated, the gears are not locked in position when the planocentric gear drive is not in use, thereby permitting the rotary output to be moved freely with respect to the stator gear. In many operating environments, this failure to lock the gears in position when the planocentric gear drive is not in use is highly undesirable.

The present invention overcomes the problems and disadvantages of the prior art by providing an improved planocentric gear drive for providing a rotary output in the form of relatively small incremental steps wherein the components of the gear drive are locked in position with respect to each other when the gear drive is not in use.

SUMMARY OF THE INVENTION

In accordance with the invention, a planocentric gear drive includes an eccentrically floating driving gear for meshing engagement with a fixed stator gear and a rotatable output gear. The stator and output gears are mounted on a common axis and are provided with different numbers of teeth for engagement with teeth on the driving gear along a common substantially axial line of contact. Circumferentially arranged electromagnets are energizable in sequence to move the driving gear orbitally in steps about the common axis of the stator and output gears in meshing engagement with said gears. During this orbital movement, the teeth of the driving gear wedge against the teeth of the output gear to rotate the output gear in relatively small angular increments. When power to the electromagnets is turned off, the driving gear remains in mesh with the stator and output gears to lock the output gear against rotation with respect to the stator gear.

In one preferred form of the invention, the coaxial stator and output gears include axially extending and radially outwardly projecting teeth or splines formed on common pitch diameters for meshing engagement with axially extending and radially inwardly projecting teeth or splines formed on a slightly larger pitch diameter on an annular driving gear. The teeth on the gears are sized and shaped, preferably to have a generally wedge-shaped profile, for relatively smooth meshing engagement with each other, with the number of teeth on the stator and output gears differing slightly, such as by one tooth. The driving gear is formed at least in part from a magnetically permeable material for attraction by each electromagnet into meshing engagement with the stator and output gears along a common axial line of contact. At this line of contact, the teeth on the driving gear mesh with the stator gear teeth and wedge against the teeth of the output gear to rotate the output gear teeth into local axial alignment with the stator gear teeth.

When the electromagnets are energized in sequence by appropriate control means, the driving gear orbits in steps about the axis of the stator and output gears whereby the meshing line of contact revolves in steps about the stator and output gears. As the line of contact revolves, the driving gear teeth wedge against the output gear teeth to rotate the output gear in relatively small incremental steps to maintain the output gear teeth in local alignment with the fixed stator gear teeth at the line of contact. When power to the electromagnets is turned off, the driving gear remains in mesh with the stator and output gears to lock those gears with respect to each other. If desired, the pitch diameter of the driving gear teeth can be chosen to prohibit free rotation of the driving gear about the axis of the stator gear to prevent the gears from moving out of mesh with each other.

The planocentric gear drive of this invention is uniquely adapted for use in a rotating sprinkler environment wherein the output gear is connected to a sprinkler nozzle for rotating the nozzle with respect to a sprinkler housing through a plurality of relatively small incremental steps. More specifically, the sprinkler housing can be coupled to a supply of water under pressure which is guided into and through the nozzle for flow upwardly and laterally outwardly as a projected water stream. This nozzle is carried by the output gear mounted on the sprinkler housing for rotation and disposed coaxially with respect to the stator gear fixed to the housing. The driving gear is positioned to float eccentrically about the stator and output gears for meshing engagement therewith on a common axial line of contact. A circumferentially arranged plurality of electromagnets carried by the housing are energizable in sequence to attract the driving gear into meshing engagement with the stator and output gears and to orbit the driving gear in steps about the axis of the stator and output gears. This results in rotation of the output gear and the sprinkler nozzle in relatively small incremental steps for altering the projected direction of the stream of water. When the energizing power to the electromagnets is turned off, the driving gear locks the stator and output gears with respect to each other to prevent undesired rotation of the sprinkler nozzle.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented perspective view illustrating an irrigation sprinkler incorporating a planocentric gear drive embodying the novel features of this invention;

FIG. 2 is an enlarged fragmented vertical section taken generally on the line 2—2 of FIG. 1, and illustrating components of the planocentric gear drive including a stator gear and an output gear in meshing engagement with an annular driving gear;

FIG. 3 is an enlarged exploded perspective view illustrating the stator gear, output gear, and driving gear;

FIG. 4 is a fragmented horizontal section taken generally on the line 4—4 of FIG. 2, and illustrating, generally in schematic form, a plurality of circumferentially arranged electromagnets operable for rotating the driving gear eccentrically about the stator gear;

FIG. 5 is an enlarged fragmented vertical section taken generally on the line 5—5 of FIG. 2, and illustrating the driving gear in meshing engagement with the output gear;

FIGS. 6a, 6b, and 6c schematically illustrate eccentric orbiting rotation of the driving gear about the stator gear and the output gear;

FIG. 7 schematically illustrates meshing engagement of the driving gear with the stator gear in a first position of operation of the planocentric gear drive;

FIG. 8 schematically illustrates meshing engagement of the driving gear with the output gear in a first position of operation of the planocentric gear drive;

FIG. 9 schematically illustrates meshing engagement of the driving gear with the stator gear in a second position of operation of the planocentric gear drive; and FIG. 10 schematically illustrates meshing engagement of the driving gear with the output gear in a second position of operation of the planocentric gear drive.

DETAILED DESCRIPTION OF THE PREFERRED EMBODIMENT

Figures 1, 2:
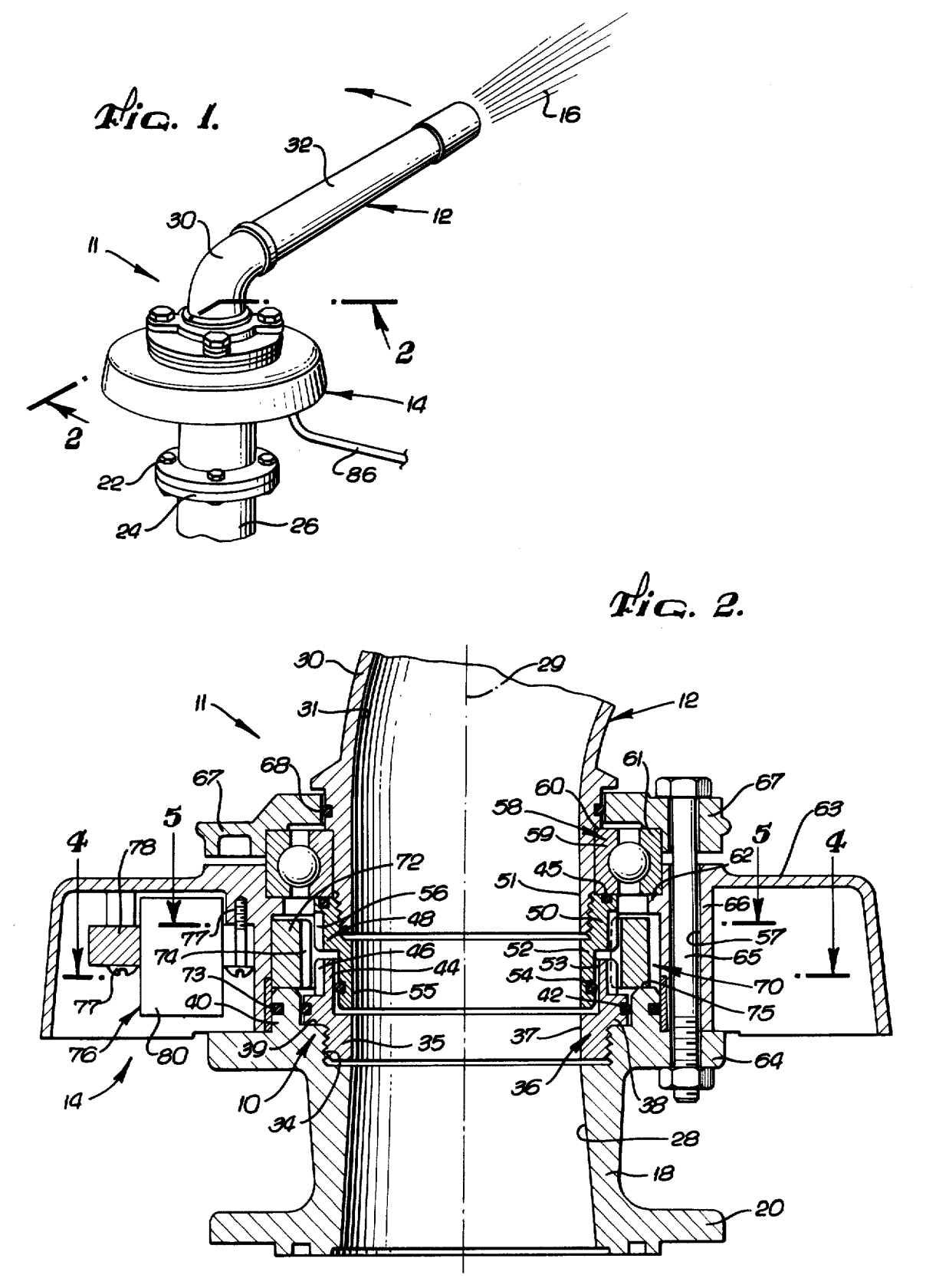

With reference to the exemplary drawings, a planocentric gear drive is indicated generally by the reference numeral 10 for use in a rotatable sprinkler 11. This rotatable sprinkler 11, as viewed in FIG. 1, includes a tubular nozzle 12 mounted on a sprinkler housing 14 for projecting a stream 16 of water in an upwardly and laterally outward direction for irrigation purposes or the like. The planocentric gear drive 10 of this invention is encased within the housing for driving the nozzle 12 rotatably about the housing in a series of relatively small incremental steps and for locking the nozzle against rotation when the sprinkler is not in use.

The planocentric gear drive 10 of this invention comprises a simplified and inexpensive arrangement of gear drive components for providing a substantially reduced speed rotational output in response to a rotary input. The gear drive is particularly suited for use as a stepping motor wherein a stepped rotary input is converted to precisely controlled and repeatable incremental output steps. The gear drive components advantageously are locked against rotation when not in use to prevent undesired rotation of the output until operation is restarted, whereupon stepping motion of the output is reinitiated from the locked position. Importantly, while the planocentric gear drive is shown and described herein for use with the rotatable sprinkler 11, the gear drive is applicable to a variety of operating environments wherein an incrementally stepped rotational output is required.

As shown in FIGS. 1 and 2, the illustrative sprinkler housing 14 includes a standpipe 18 having a lower flange 20 for connection by bolts 22 to a mating flange 24 of an upstanding water supply pipe 26. Alternately, the standpipe 18 can be adapted for connection to virtually any type of water supply conduit, such as a hose or the like. In any event, the standpipe 18 defines a flow path 28 extending along a vertical axis 29 for passage of water under pressure from the supply pipe 26 upwardly through the housing 14 and into the tubular nozzle 12. In the embodiment illustrated, this tubular nozzle 12 comprises an elbow tube 30 carried at its lower end by the housing 14 and defining a flow path 31 which extends upwardly along the vertical axis 29 and then turns laterally through an angle of say about 60 degrees. The upper end of the elbow tube is joined to an elongated linear extension tube 32 which guides the water further for projection therefrom in a generally upwardly and laterally outward direction in the form of the water stream 16.

The planocentric gear drive 10 is mounted at the upper end of the standpipe 18 and supports the sprinkler nozzle 12 for controlled rotation about the vertical axis 29 with respect to the standpipe. More specifically, with reference to FIGS. 2-4, the upper end of the standpipe 18 includes an axially extending and internally threaded counterbore 34 for reception of a depending threaded sleeve 35 of an annular stator gear 36. This threaded sleeve 35 has a smooth inner diameter surface 37 aligned with the standpipe 18 to define an extension of the standpipe flow path 28 for upward passage of the water.

The threaded sleeve 35 of the stator gear 36 is joined at its upper end to a radially enlarged annular ring 38 which is carried into abutting engagement with an upper face 39 of the standpipe 18 when the sleeve 35 is threaded into the standpipe counterbore 34. This enlarged ring 38 is positioned concentrically within an upstanding annular boss 40 on the standpipe 18, and an annular seal ring 42, such as an O-ring of an elastomeric material, is captured between the ring 38 and the boss 40 to prevent leakage of water therebetween.

The stator gear 36 further includes a toothed sleeve 44 projecting axially upwardly from the annular ring 38. According to the invention, the toothed sleeve 44 defines a plurality of axially elongated teeth 46, or splines, presented in a radially outward direction. In a preferred form of the invention, as viewed best in FIGS. 3 and 4, these teeth 46 are shaped to have a generally triangular or wedge-shaped profile. Importantly, these teeth 46 of the stator gear 36 are fixed in position against rotation with respect to the sprinkler housing 14 by virtue of the threaded connection between the stator gear threaded sleeve 35, and the standpipe 18.

A rotatable output gear 48 is secured to the sprinkler nozzle 12 for rotation about the vertical axis 29 with respect to the fixed stator gear 36. More specifically, the output gear 48 is provided in the form of an annular sleeve 50 which is internally threaded at its upper end for engagement with an externally threaded lower end 51 of the nozzle 12. This sleeve 50 is joined to a lower shoulder 52 projecting axially downwardly into a radially enlarged counterbore 53 formed within the toothed sleeve 44 of the stator gear 36, with a seal ring 54, such as an elastomeric O-ring, being trapped between the sleeve 44 and the shoulder 52. Moreover, this seal ring 54 accommodates rotation of the output gear 48 relative to the stator gear 36 without leakage of water between the shoulder 52 and the toothed sleeve 44. Conveniently, the inner diameter surface 55 on the shoulder 52 is formed coaxially with the adjacent inner diameter surface 37 of the stator gear to provide a smooth continuation of the water flow path between the standpipe and the nozzle.

The output gear 48 has a number of teeth 56, or splines, formed on the annular sleeve 50 directly above the teeth 46 on the stator gear 36. That is, the output gear teeth 56 are axially elongated and are presented in a radially outward direction, preferably to have a generally triangular or wedge-shaped tooth profile. Further, these output gear teeth 56 are formed about the vertical axis 29 on a pitch diameter substantially identical to the pitch diameter of the stator gear teeth 46. However, the number of teeth 56 on the output gear 48 differs slightly, such as by one tooth, from the number of teeth 46 on the stator gear 36.

The output gear 48 and the sprinkler nozzle 12 are supported for rotation relative to the sprinkler housing 14 by a rotary bearing, such as a conventional ball bearing assembly 58 carried about the lower end of the nozzle. This bearing assembly 58 includes a rotatable race 59 vertically supported between a seal ring 45 at the upper end of the output gear 48 and a downwardly presented shoulder 60 on the nozzle 12, and a fixed race 61 vertically supported upon an upwardly presented shoulder 62 of an annular shell 63 forming part of the housing 14. This shell 63 is secured to a flange 64 on the standpipe 18 by a plurality of bolts 65 fastened through the flange 64 and bolt openings 57 in an upstanding annular wall 66 of the shell 63. Moreover, these bolts 65 are fastened through an upper annular end cap 67 to clamp the end cap downwardly upon the fixed race 61 of the bearing assembly. Conveniently, a seal ring 68 of an elastomeric material or the like is trapped between the end cap 67 and the nozzle 12 to prevent dirt from coming into contact with the bearing assembly 58 while permitting rotation of the nozzle within the end cap.

The sprinkler housing 14 cooperates with the stator and output gears 36 and 48 to define a sealed annular chamber 70 in which is carried an annular driving gear 72 configured for meshing engagement with the stator and output gears. More specifically, the stator and output gears 36 and 48 cooperate with the standpipe flange 64, the bearing assembly 58 and overlying end cap 67, and the annular wall 66 of the housing shell 63 to define the chamber 70. Conveniently, as illustrated, the annular wall 66 engages the flange 64 concentrically about the standpipe boss 40, and a seal ring 73 such as an elastomeric O-ring is captured between the wall 66 and the boss 40 to commplete sealing enclosure of the chamber 70. If desired, a lubricant can be provided within the chamber for lubrication of the gears and the bearing assembly 58.

The driving gear 72 comprises an annular ring formed at least in part from a magnetically permeable material and having a plurality of axially elongated and radially inwardly presented teeth 74, or splines. The driving gear 72 is vertically supported within the chamber 70 upon the upper face 75 of the standpipe boss 40 to position the teeth 74 for meshing engagement with the teeth on both the stator gear 36 and the output gear 48. As viewed best in FIGS. 4 and 5, these driving gear teeth 74 are formed on a pitch diameter slightly greater than the pitch diameter of the stator and output gear teeth 46 and 56 to permit the driving gear to float eccentrically without free rotation with respect to the stator and output gears. Moreover, the driving gear teeth 74 are sized and shaped for smooth meshing engagement with the teeth 46 and 56 on the stator and output gears. In the illustrative embodiment, the driving gear teeth are thus shown to have a generally triangular or wedge-shaped profile and are provided in a number slightly greater than the number of teeth on either the stator or output gears.

The driving gear 72 is shifted horizontally into meshing engagement with the stator and output gears 36 and 48 by a plurality of electromagnets 76. These electromagnets 76 are arranged circumferentially about the gears and are secured by screws 77 to the underside of the housing shell 63. Each electromagnet comprises a magnetizable core 78 carrying a field winding 80 which is coupled by conductors 81 to an electrical current control device 82. Importantly, each electromagnet 76 is oriented with one of its magnetic poles presented directly toward the vertical axis 29 to produce when energized a magnetic field which acts in a horizontal plane through the annular wall 66 of the shell 63 for direct pole attraction of the floating driving gear 72. Alternatively, if desired, the electromagnets can be formed to extend through the annular wall 66 to minimize the electromagnetic gap with respect to the driving gear. While four of these electromagnets 76 are illustrated schematically at 90-degree intervals in FIGS. 4 and 5, any number of electromagnets greater than two can be utilized.

When one of the electromagnets 76 is energized by supply of electrical current from the control device 82, as illustrated by way of example with respect to the electromagnet at the left-hand side of FIGS. 4 and 5, the energized electromagnet attracts the driving gear with a magnetic force acting in the direction of arrow 84 to shift the driving gear in the horizontal plane to an eccentric or offset position with respect to the coaxial stator and output gears. This movement of the driving gear 72 pulls a diametrically opposite point of the driving gear into meshing engagement with the stator and output gears 36 and 48 on a common axial line of contact, as illustrated by the point 85 in FIGS. 4, 5, and 6a. To achieve this meshing engagement, the driving gear 72 floats sufficiently in the horizontal plane to mesh its teeth 74 with the fixed teeth 46 of the fixed stator gear 36 at the line of contact. In the event the teeth 56 of the output gear 48 are not axially aligned with the stator gear teeth 46 at the line of contact, the driving gear teeth 74 wedge against the output gear teeth 56 to rotate slightly the output gear and bring its teeth 56 into local axial alignment with the stator gear teeth at the line of contact.

In operation of the planocentric gear drive 10, the plurality of electromagnets 76 are energized by the control device 82 in sequence about the circumference of the gears. This control device 82 incorporates appropriate timing and switching elements (not shown) of conventional design for switching electrical current supplied by a power cord 86 from a power source (also not shown) to each successive electromagnet in sequence. This sequential energization of the electromagnets 76 causes the driving gear to orbit in steps about the common axis of the stator and output gears, which results in a corresponding stepwise shifting in the position of the common axial line of contact of the driving gear 72 with the stator and output gears 36 and 48. Since the stator and output gears are provided with different numbers of teeth, the output gear 48 is rotated in an incremental step each time the next electromagnet in succession is energized to maintain its teeth 56 in local alignment with the stator gear teeth 46 at the common axial line of contact.

This stepwise orbiting of the driving gear 72 and resulting incremental rotation of the output gear 48 is illustrated schematically in FIGS. 6a-6c, and with reference to a specific operating example of the invention in FIGS. 7-10. More specifically, as illustrated, energization of the electromagnet 76 at the left-hand side of these figures produces a magnetic force acting in the direction of the arrow 84 in FIG. 6a to pull a diametrically opposite point of the driving gear into meshing engagement with the stator and output gears 36 and 48 on the common axial line of contact illustrated by the point 85. When the control device 82 switches the electrical current to energize the next electromagnet in sequence, designated by the numeral 76' in FIGS. 6-10, the magnetic force acting in the direction of the arrow 84 is removed and a new magnetic force is produced which acts in the direction of the arrow 87. Since the illustrated embodiment utilizes four electromagnets 76 at 90-degree intervals, this new magnetic force acts upon the driving gear 72 at a right angle with respect to the previously applied force.

This magnetic force acting in the direction of arrow 87 causes the driving gear 72 to shift in the horizontal plane toward the now energized electromagnet 76' to a different eccentric position with respect to the stator and output gears, as viewed in FIGS. 6c, 7, and 10. During this movement, the common axial line of meshing contact of the driving gear with the stator and output gears shifts or revolves in the direction of arrow 88 in FIGS. 6b, 7, and 8 to a new position diametrically opposite the now-energized electromagnet 76', as illustrated by the point 85. More specifically, the driving gear 72 revolves or orbits eccentrically about the common axis of the stator and output gears with its teeth 74 meshing with the fixed teeth 46 of the stator gear 36 whereby the meshing point 85 revolves through an arcuate path of 90 degrees to the new position. Importantly, during this revolving movement, the driving gear teeth 72 wedge against the output gear teeth 56 to rotate the output gear 48 incrementally so that its teeth 56 remain in local axial alignment with the fixed stator gear teeth 46 at the line of contact. This incremental rotation of the output gear is repeated each time the next electromagnet in succession is energized.

The magnitude and direction of output gear incremental rotation is a function of the absolute and relative numbers of teeth provided on the various gears. More specifically, with reference to the operating example in FIGS. 7-10, the driving gear 72 is provided with one tooth more than the number of teeth on the stator gear 36, and the output gear 48 is provided with one tooth less than the number of teeth on the stator gear. With this configuration, the teeth 74 on the driving gear 72 are individually sized for smooth engagement with the teeth on the stator and output gears and are formed on a pitch diameter for sufficient eccentric floating in the horizontal plane without free rotation of the driving gear about the stator and output gears. Accordingly, the driving gear 72 rotates slowly about its own axis through an angular increment corresponding to one of its teeth 74 for each full cycle of energization of the electromagnets 76. With the four electromagnets shown, the driving gear 72 thus rotates about its own axis through an angular increment corresponding to one-quarter tooth each time a new electromagnet is energized. This incremental rotation is illustrated in FIGS. 7 and 9 wherein a reference tooth 74' on the driving gear 72 is shown advancing through an angular increment of one-quarter tooth for meshing engagement between a pair of fixed teeth 46' on the stator gear 36.

Since the output gear 48 has one tooth less than the number of teeth 46 on the stator gear, the output gear teeth 56 are advanced increasingly from axial alignment with the stator gear teeth 46 in a rotational direction away from the common axial line of contact. The incremental magnitude of this misalignment is one-quarter tooth for each 90 degrees of circumference of the output gear. Moreover, the number of output gear teeth 56 is two less than the number of teeth 74 on the driving gear 72 whereby the output gear teeth are advanced increasingly from axial alignment with the driving gear teeth 74 by an angular increment corresponding to one-half tooth for each 90 degrees of circumference, as illustrated in FIG. 8.

When the driving gear 72 is orbitally stepped about the stator and output gears, the driving gear teeth 74 advance one-quarter tooth during each step to maintain meshing engagement with the stator gear teeth 46. This one-quarter tooth advance is insufficient to maintain meshing engagement with the output gear teeth 56, whereby the driving gear teeth 74 wedge against the output gear teeth 56 to rotate the output gear 48 in the opposite direction as illustrated by the arrow 89 in FIG. 8. The angular magnitude of this output gear rotation corresponds with the incremental axial misalignment between the output and stator gears for each 90 degrees of circumference. In the example shown, this misalignment corresponds to the incremental width of one-quarter tooth 56 of the output gear. Accordingly, in an example wherein the output gear includes 90 teeth 56, each tooth 56 has an incremental width of 4 degrees and the incremental rotation of the output gear upon energization of each electromagnet in succession is 1 degree.

The output gear 48 carries the sprinkler nozzle 12 and thereby rotates the nozzle incrementally each time the next electromagnet in succession is energized. The direction and magnitude of nozzle rotation corresponds with the direction and magnitude of output gear rotation according to the numbers of teeth on the gears and the number of electromagnets for eccentrically rotating the driving gear. In this manner, the projected direction of the water stream 16 is altered at precisely timed intervals under the control of the control device 82 and moved to the next rotational position according to the relative numbers of teeth on the various gears.

When electrical current to the electromagnets 76 is turned off, such as when the sprinkler is not is use, the gears advantageously remain locked in engagement with each other to prevent undesired rotation of the nozzle 12. That is, the driving gear 72 remains in engagement with the stator and output gears with the line of contact therebetween being positioned diametrically opposite the last-energized electromagnet. The driving gear 72 thereby provides a locking connection between the output gear 48 and the fixed stator gear 36 to prevent rotation of the output gear. This locking engagement is advantageously assured when the driving gear 74 has a pitch diameter sufficiently small to prevent free rotation of the driving gear 72 about the common axis of the stator and output gears, as described herein with respect to one preferred embodiment. With this configuration, the nozzle 12 remains locked in the last position of operation until the electromagnets 76 are again energized in sequence to initiate restepping of the nozzle from the locked position.

The planocentric gear drive 10 of this invention thus comprises a simplified and inexpensive arrangement of gear components designed to provide a rotational output in the form of relatively small incremental steps. The gear drive advantageously includes a minimum number of parts which move relatively slowly with respect to each other for low wear and long life. Moreover, the gear drive can be adapted for use in a large number of applications with the specific speed, magnitude, and direction of the rotationally stepped output being chosen from within a wide design range by appropriate selection of the relative sizes and numbers of teeth on the gears, by selection of the number of electromagnets, and by appropriate timed operation of the control device 82.

Further modifications and improvements to the planocentric gear drive 10 shown and described herein are believed to be apparent to one skilled in the art. For example, alternate tooth forms on various gears can be used, such as spiral or helical forms, wherein the teeth have sufficient axial elongation to permit engagement by the driving gear with the output and stator gears on a substantially axial line of common contact. Accordingly, no limitation upon the invention is intended, except by way of the appended claims.

What is claimed is:

1. A planocentric gear drive, comprising:
    a fixed stator gear and a rotatable output gear mounted coaxially and having different numbers of teeth;
    a toothed driving gear formed at least in part from a magnetically permeable material and supported for eccentric floating with respect to said common axis and for meshing engagement with said stator and output gears on a common axial line of contact; and
    electromagnetic means for orbiting said driving gear about said axis in meshing engagment with said stator and output gears, whereby the teeth on said driving gear wedge against the teeth on said output gear to rotate said output gear with respect to said stator gear.

2. The planocentric gear drive of claim 1 wherein the teeth on said stator, output, and driving gears are formed to have a generally wedge-shaped tooth profile.

3. The planocentric gear drive of claim 1 wherein the teeth on said stator and output gears are presented in a common radial direction, and wherein the teeth on said driving gear are presented in an opposite radial direction for meshing engagement with the teeth on said stator and output gears.

4. The planocentric gear drive of claim 1 wherein the teeth on said stator and output gears are presented in a radially outward direction, and wherein said driving gear is generally annular in shape with the teeth formed thereon being presented in a radially inward direction for meshing engagement with the teeth on said stator and output gears.

5. The planocentric gear drive of claim 4 wherein the teeth on said driving gear are formed on a pitch diameter slightly larger than the pitch diameters of the teeth on said stator and output gears to permit eccentric floating of said driving gear without free rotation thereof with respect to the central axis of said stator and output gears.

6. The planocentric gear drive of claim 1 wherein said electromagnetic means comprises a plurality of electromagnets arranged circumferentially about said driving gear for magnetically attracting said driving gear into meshing engagement with said stator and output gears, and means for energizing said electromagnets in succession circumferentially about said driving gear for eccentrically rotating said driving gear about said stator and output gears.

7. The planocentric gear drive of claim 6 wherein each of said electromagnets is oriented for substantially direct pole attraction of said driving gear.

8. The planocentric gear drive of claim 1 wherein the number of teeth on said output gear differs by one from the number of teeth on said stator gear.

9. A planocentric gear drive, comprising:
    a stator gear fixed against rotation about a central axis and having an annular set of teeth;
    an output gear mounted coaxially with said stator gear for rotation about said axis and having an annular set of teeth provided in a number different from the number of teeth on said stator gear;
    a driving gear formed at least in part from a magnetically permeable material and disposed for eccentric floating about said axis and having an annular set of teeth for meshing engagement on a common axial line of contact with the teeth on said stator and output gears; and
    electromagnetic means for orbiting said driving gear in steps about said central axis in meshing engagement with said stator and output gears, whereby the teeth on said driving gear wedge against the teeth on said output gear to rotate said output gear in relatively small incremental steps.

10. The planocentric gear drive of claim 9, wherein the teeth on said stator, output, and driving gears are formed to have a generally wedge-shaped tooth profile.

11. The planocentric gear drive of claim 9 wherein the teeth on said driving gear are formed on a pitch diameter sized with respect to the stator and output gears to permit eccentric floating of said driving gear without free rotation of said driving gear about said axis.

12. The planocentric gear drive of claim 9 wherein the teeth on said stator, output, and driving gears are elongated generally in a common axial direction.

13. The planocentric gear drive of claim 9 wherein the teeth on said stator and output gears are presented in a common radial direction, and wherein the teeth on said driving gear are presented in an opposite radial direction for meshing engagement with the teeth on said stator and output gears.

14. The planocentric gear drive of claim 13 wherein the teeth on said stator and output gears are presented in a radially outward direction, and wherein said driving gear is generally annular in shape with the teeth formed thereon being presented in a radially inward direction for meshing engagement with the teeth on said stator and output gears.

15. The planocentric gear drive of claim 13 wherein the teeth on said driving gear each include a first portion for engagement with the teeth of said stator gear and a second portion for engagement with the teeth on said output gear, and wherein the first and second portions of the teeth are formed respectively on a pitch diameter slightly different from the pitch diameters of the teeth on said stator and output gears to permit eccentric floating of the driving gear without free rotation thereof about said axis.

16. The planocentric gear drive of claim 13 wherein the teeth on said stator and output gears are formed substantially on common pitch diameters for meshing engagement with the teeth on said driving gear.

17. The planocentric gear drive of claim 16 wherein the teeth on said driving gear are formed on a pitch diameter slightly larger than the pitch diameters of the teeth on said stator and output gears to permit eccentric floating of said driving gear.

18. The planocentric gear drive of claim 9 wherein said electromagnetic means comprises a plurality of electromagnets arranged circumferentially about said driving gear for magnetically attracting said driving gear into meshing engagement with said stator and output gears, and means for energizing said electromagnets in succession circumferentially about said driving gear for eccentrically rotating said driving gear about said stator and output gears.

19. The planocentric gear drive of claim 18 wherein each of said electromagnets is oriented for substantially direct pole attraction of said driving gear.

20. The planocentric gear drive of claim 9 wherein the number of teeth on said output gear differs by one from the number of teeth on said stator gear.

21. The planocentric gear drive of claim 9 wherein the number of teeeth on said driving gear is different from the number of teeth on said stator gear, whereby said driving gear rotates about its own axis during orbiting movement about said central axis of said stator gear.

22. A planocentric gear drive, comprising:
a stator gear fixed against rotation about a central axis and including an annular set of generally axially extending teeth presented in a first radial direction;
an output gear mounted coaxially with said stator gear for rotation with respect to said central axis and including an annular set of generally axially extending teeth presented in said first radial direction, the number of teeth on said output gear being provided in a number differing by at least one from the number of teeth on said stator gear;
a driving gear formed at least in part from a magnetically permeable material and sized for eccentric floating about said central axis, said driving gear having an annular set of generally axially extending teeth for meshing engagement on a common and generally axially extending line of contact with the teeth on said stator and output gears;
a plurality of electromagnets arranged circumferentially with respect to said gears for magnetically displacing said driving gear into meshing engagement with said stator and output gears; and
control means for energizing said electromagnets in circumferential sequence for eccentrically displacing said driving gear with respect to said central axis into meshing engagement with said stator and output gears whereby the teeth on said driving gear wedge against the teeth on said output gear upon energization of each electromagnet in succession to rotate said output gear in relatively small incremental steps.

23. The planocentric gear drive of claim 22 wherein said plurality of electromagnets comprises at least three electromagnets.

24. The planocentric gear drive of claim 22 wherein each of said electromagnets is oriented for substantially direct pole attraction of said driving gear.

25. The planocentric gear drive of claim 22 wherein the teeth on said stator and output gears have a generally wedge-shaped profile presented in a generally radially outward direction, and wherein the teeth on said driving gear have a generally wedge-shaped profile presented in a generally radially inward direction and formed on a pitch diameter slightly larger than the pitch diameter of the teeth on said stator and output gears.

26. The planocentric gear drive of claim 25 wherein the teeth on said driving gear are substantially identical in size to the teeth of said stator gear and are provided in a number at least one greater than the number of teeth of said stator gear.

27. The planocentric gear drive of claim 26 wherein the number of teeth on said output gear is one less than the number of teeth on said stator gear.

28. The planocentric gear drive of claim 25 wherein the teeth on said driving gear are formed on a pitch diameter sufficient to permit eccentric floating of said driving gear without free rotation thereof with respect to said stator gear.

29. A planocentric gear drive, comprising:
a housing;
a stator gear fixed to said housing and having an annular set of generally radially outwardly presented and generally axially elongated teeth formed about a central axis;
an output gear having an annular set of generally radially outwardly presented and generally axially elongated teeth mounted for rotation about said central axis, the number of teeth on said output gear differing by at least one from the number of teeth on said stator gear;
a driving gear formed at least in part from a magnetically permeable material and having an annular set of generally radially inwardly presented and axially elongated teeth formed on a pitch diameter slightly larger than the pitch diameter of the teeth on said stator and output gears, whereby said driving gear is movable eccentrically with respect to said stator and output gears;
means for supporting said driving gear for meshing engagement of its teeth with the teeth on said stator and output gears on a common, generally axially extending line of contact; and means for orbiting said driving gear in steps about said central axis in meshing engagement with said stator and output gears, whereby the teeth on said driving gear wedge against the teeth on said output gear to rotate said output gear in relatively small incremental steps.

30. The planocentric gear drive of claim 29 wherein the teeth on said driving gear are formed on a pitch diameter sufficient to permit eccentric floating of said driving gear without free rotation thereof with respect to said stator gear.

31. The planocentric gear drive of claim 29 wherein said driving gear is formed at least in part from a magnetically permeable material, and wherein said orbiting means comprises electromagnetic means for moving said driving gear orbitally about said central axis in meshing engagement with said stator and output gears.

32. The planocentric gear drive of claim 31 wherein said electromagnetic means comprises a plurality of electromagnets arranged circumferentially about said driving gear for magnetically attracting said driving gear into meshing engagement with said stator and output gears, and means for energizing said electromagnets in succession circumferentially about said driving gear for eccentrically rotating said driving gear about said stator and output gears.

33. In a sprinkler device having a sprinkler housing for receiving a supply of water under pressure, and a sprinkler nozzle for passage of the water in the form of a water stream in a generally laterally outward direction from the housing, a gear drive for controlled rotation of the nozzle in relatively small incremental steps with respect to the housing, comprising:

a stator gear mounted against rotation on said housing and having an annular set of teeth arranged about a central axis;

an output gear having an annular set of teeth provided in a number differing from the number of teeth on said stator gear and being mounted with respect to said housing for rotation of its teeth about said central axis, said output gear being coupled to the sprinkler nozzle for rotating the nozzle upon rotation of said output gear;

a driving gear having an annular set of teeth formed on a pitch diameter to permit eccentric floating of said driving gear with respect to said stator and output gears, the teeth on said driving gear being engageable in mesh simultaneously with the teeth on said stator and output gears on a common axial line of contact; and means carried by said housing for moving said driving gear eccentrically in steps with respect to said stator and output gears to orbit said driving gear in steps about said central axis in meshing engagement with said stator and output gears, whereby the teeth on said driving gear wedge against the teeth on said output gear to rotate said output gear and the nozzle in relatively small incremental steps.

34. The gear drive of claim 33 wherein the teeth on said stator, output, and driving gears are formed to have a generally wedge-shaped tooth profile.

35. The gear drive of claim 33 wherein the teeth on said driving gear are formed on a pitch diameter sized with respect to the stator and output gears to permit eccentric floating of said driving gear without free rotation of said gear about said axis.

36. The gear drive of claim 33 wherein the teeth on said stator and output gears are elongated generally in an axial direction and are presented in a common radial direction, and wherein the teeth on said driving gear are elongated generally in the axial direction and are presented in an opposite radial direction for meshing engagement with the teeth on said stator and output gears.

37. The gear drive of claim 36 wherein the teeth on said stator and output gears are presented generally in a radially outward direction.

38. The gear drive of claim 37 wherein said stator and output gears are generally annular in shape and are aligned axially for passage of the water from the housing into the nozzle.

39. The gear drive of claim 37 wherein said driving gear is formed at least in part from a magnetically permeable material, and wherein said orbiting means comprises electromagnetic means for moving said driving gear orbitally about said central axis in meshing engagement with said stator and output gears.

40. The gear drive of claim 39 wherein said electromagnetic means comprises a plurality of electromagnets arranged circumferentially about said driving gear for magnetically attracting said driving gear into meshing engagement with said stator and output gears, and means for energizing said electromagnets in succession circumferentially about said driving gear for eccentrically rotating said driving gear about said stator and output gears.

41. The gear drive of claim 40 wherein each of said electromagnets is oriented for substantially direct pole attraction of said driving gear.

42. The gear drive of claim 33 wherein the number of teeth on said driving gear is different from the number of teeth on said stator gear, whereby said driving gear rotates about its own axis during orbiting movement about said central axis of said stator gear.

43. In a sprinkler device having a sprinkler housing for receiving a supply of water under pressure, and a sprinkler nozzle for passage of the water in the form of a water stream in a generally laterally outward direction from the housing, a gear drive for controlled rotation of the nozzle in relatively small incremental steps with respect to the housing, comprising:

an annular stator gear mounted against rotation on said housing and having an annular set of generally radially outwardly presented and axially elongated teeth arranged about a central axis;

an annular output gear carrying the sprinkler nozzle and having an annular set of generally radially outwardly presented and axially elongated teeth provided in a number different from the number of teeth on said stator gear, said output gear being mounted with respect to said housing for rotation of its teeth about said central axis, said output gear cooperating with said stator gear to define an open flow path for flow of water from the housing into the nozzle;

an annular driving gear formed at least in part from a magnetically permeable material and sized for eccentric floating about said central axis, said driving gear including an annular set of generally radially inwardly presented and axially elongated teeth on said stator and output gears generally on a common axial line of contact;

a plurality of at least three electromagnets arranged circumferentially about said gears, each of said electromagnets being energizable for magnetically displacing said driving gear into meshing engagement with said stator and output gears; and control means for energizing said electromagnets in circumferential succession for eccentrically displacing said driving gear in steps with respect to said central axis into meshing engagement with said stator and output gears, whereby the teeth on said driving gear wedge against the teeth on said output gear upon energization of each electromagnet in succession to rotate said output gear in relatively small incremental steps.

44. The gear drive of claim 43 wherein said electromagnets are carried by the sprinkler housing.

45. The gear drive of claim 43 wherein said control means is carried by the sprinkler housing.

46. The gear drive of claim 43 wherein each of said electromagnets is oriented for substantially direct pole attraction of said driving gear.

47. The gear drive of claim 43 wherein the teeth on said stator, output, and driving gears are formed to have a generally wedge-shaped tooth profile, and wherein the teeth on said driving gear are formed on a pitch diameter sized with respect to the stator and output gears to permit eccentric floating of said driving gear without free rotation of said driving gear about said axis.

48. The gear drive of claim 43 wherein the number of teeth on said driving gear is different from the number of teeth on said stator gear, whereby said driving gear rotates about its own axis during orbiting movement about said central axis of said stator gear.

49. A sprinkler device, comprising:

a sprinkler housing having a flow path formed therein for flow of water under pressure;

an annular stator gear mounted against rotation on said housing and having an annular set of generally axially extending and radially outwardly presented teeth formed about a central axis;

an annular output gear having an annular set of generally axially extending and radially outwardly presented teeth provided in a number different from the number of teeth on said stator gear, said output gear being mounted on said housing for rotation of its teeth about said central axis and in a position axially adjacent said stator gear;

a sprinkler nozzle carried by said output gear for rotation therewith, said nozzle being configured for passage of water in a generally laterally outward direction, said stator and output gears cooperating to define an open passage for flow of water from said housing flow path into and through said nozzle;

an annular driving gear formed at least in part from a magnetically permeable material and sized for eccentric floating about said central axis, said driving gear including an annular set of generally radially inwardly presented and axially elongated teeth disposed for simultaneous meshing engagement with the teeth on said stator and output gears generally on a common axial line of contact;

a plurality of at least three electromagnets arranged circumferentially about said gears, each of said electromagnets being energizable for magnetically displacing said driving gear into meshing engagement with said stator and output gears; and control means for energizing said electromagnets in circumferential succession for eccentrically displacing said driving gear in steps with respect to said central axis into meshing engagement with said stator and output gears, whereby the teeth on said driving gear wedge against the teeth on said output gears upon energization of each electromagnet in succession to rotate said output gear in relatively small incremental steps.

50. The sprinkler device of claim 49 wherein said housing includes means forming a sealed annular chamber for reception of said driving gear about said stator and output gears, said support means for supporting said driving gear within said chamber in a position for simultaneous meshing engagement with said stator and output gears.

51. The sprinkler device of claim 49 wherein said stator and output gears include concentrically interfitting portions, and including seal means interposed between said portions for permitting relative rotation of said output gear without passage of water between said portions.

52. The sprinkler device of claim 49 wherein said electromagnets are each carried by said housing in an orientation for direct pole attraction of said driving gears.

53. The sprinkler device of claim 49 wherein the teeth on said stator, output, and driving gears are formed to have a generally wedge-shaped tooth profile, and wherein the teeth on said driving gear are formed on a pitch diameter sized with respect to the stator and output gears to permit eccentric floating of said driving gear without free rotation of said driving gear about said axis.

* * * * *